US012524331B2

(12) United States Patent
Evans et al.

(10) Patent No.: US 12,524,331 B2
(45) Date of Patent: Jan. 13, 2026

(54) METHOD AND APPARATUS TO RECOGNIZE AND CORRELATE SCREENS

(71) Applicant: MICRO FOCUS LLC, Santa Clara, CA (US)

(72) Inventors: Gary Jason Evans, High Peak (GB); Arnoldus Bernardus Johannes Maria Geels, Utrecht (NL); Brett L. Hall, Kennewick, WA (US); Karl A. Uppiano, Ferndale, WA (US)

(73) Assignee: Micro Focus LLC, Santa Clara, CA (US)

( * ) Notice: Subject to any disclaimer, the term of this patent is extended or adjusted under 35 U.S.C. 154(b) by 138 days.

(21) Appl. No.: 18/450,300

(22) Filed: Aug. 15, 2023

(65) Prior Publication Data

US 2025/0061048 A1 Feb. 20, 2025

(51) Int. Cl.
*G06F 9/44* (2018.01)
*G06F 11/3668* (2025.01)

(52) U.S. Cl.
CPC ...... *G06F 11/3684* (2013.01); *G06F 11/3688* (2013.01)

(58) Field of Classification Search
CPC .......................... G06F 11/3684; G06F 11/3688
See application file for complete search history.

(56) References Cited

U.S. PATENT DOCUMENTS

| 11,055,205 | B1* | 7/2021 | Chauhan | G06F 11/3688 |
| 11,550,707 | B2* | 1/2023 | Vasavan | G06F 11/3688 |
| 2006/0041862 | A1* | 2/2006 | Moussallam | G06F 16/972 |
| | | | | 717/120 |
| 2019/0065351 | A1* | 2/2019 | Rakhmilevich | G06F 11/3688 |
| 2019/0370152 | A1* | 12/2019 | Godefroid | G06F 11/3688 |

OTHER PUBLICATIONS

"3270 Information Display System Data Stream Programmer's Reference," IBM, Dec. 1988, 5th Ed. GA23-0059-4, 380 pages.
Kelly "TN3270 Enhancements," The Internet Society, Jun. 1998, RFC 2355, 38 pages.
Penner "TN3270 Current Practices," Network Working Group, Jan. 1994, RFC 1576, 12 pages.

* cited by examiner

*Primary Examiner* — Qamrun Nahar
(74) *Attorney, Agent, or Firm* — Sheridan Ross P.C.

(57) ABSTRACT

Text screen description data for a terminal-based application is received. For example, the text screen description data may be received via an Application Programming Interface (API) call. The text screen description data comprises a screen description and one or more text field descriptions associated with the screen description. The one or more text field descriptions are associated with one or more text fields. The text screen description data is based on Basic Mapping Support (BMS) mappings. Image data of a screen for the terminal-based application is captured. The captured image data of the screen of the terminal-based application is correlated to the text screen description data for the terminal-based application to identify the one or text fields. As a result, a test script is automatically generated to test the one or more text fields based on the correlation.

20 Claims, 2 Drawing Sheets

METHOD AND APPARATUS TO RECOGNIZE AND CORRELATE SCREENS

FIELD

The disclosure relates generally to terminal-based applications and particularly to being able to correlate data displayed by terminal-based application to actual source code data.

BACKGROUND

An ongoing problem with terminal-based application testing has to do with the terminal recognizing which host screen is being presented. In addition, users that configure the host application testing system have to identify the screen fields based on screen coordinates (e.g., based on row/column). This process is tedious and error prone. What is more, if a host application is modified, the field positions may change. This causes the screen coordinates to change, thus requiring a rewrite of test scripts, which in turn causes longer development cycles and more errors in the terminal-based application/test scripts.

SUMMARY

These and other needs are addressed by the various embodiments and configurations of the present disclosure. The present disclosure can provide a number of advantages depending on the particular configuration. These and other advantages will be apparent from the disclosure contained herein.

Text screen description data for a terminal-based application is received. For example, the text screen description data may be received via an Application Programming Interface (API) call. The text screen description data comprises a screen description and one or more text field descriptions associated with the screen description. The one or more text field descriptions are associated with one or more text fields. The text screen description data is based on Basic Mapping Support (BMS) mappings. Image data of a screen for the terminal-based application is captured. The captured image data of the screen of the terminal-based application is correlated to the text screen description data for the terminal-based application to identify the one or text fields. As a result, a test script is automatically generated to test the one or more text fields based on the correlation.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
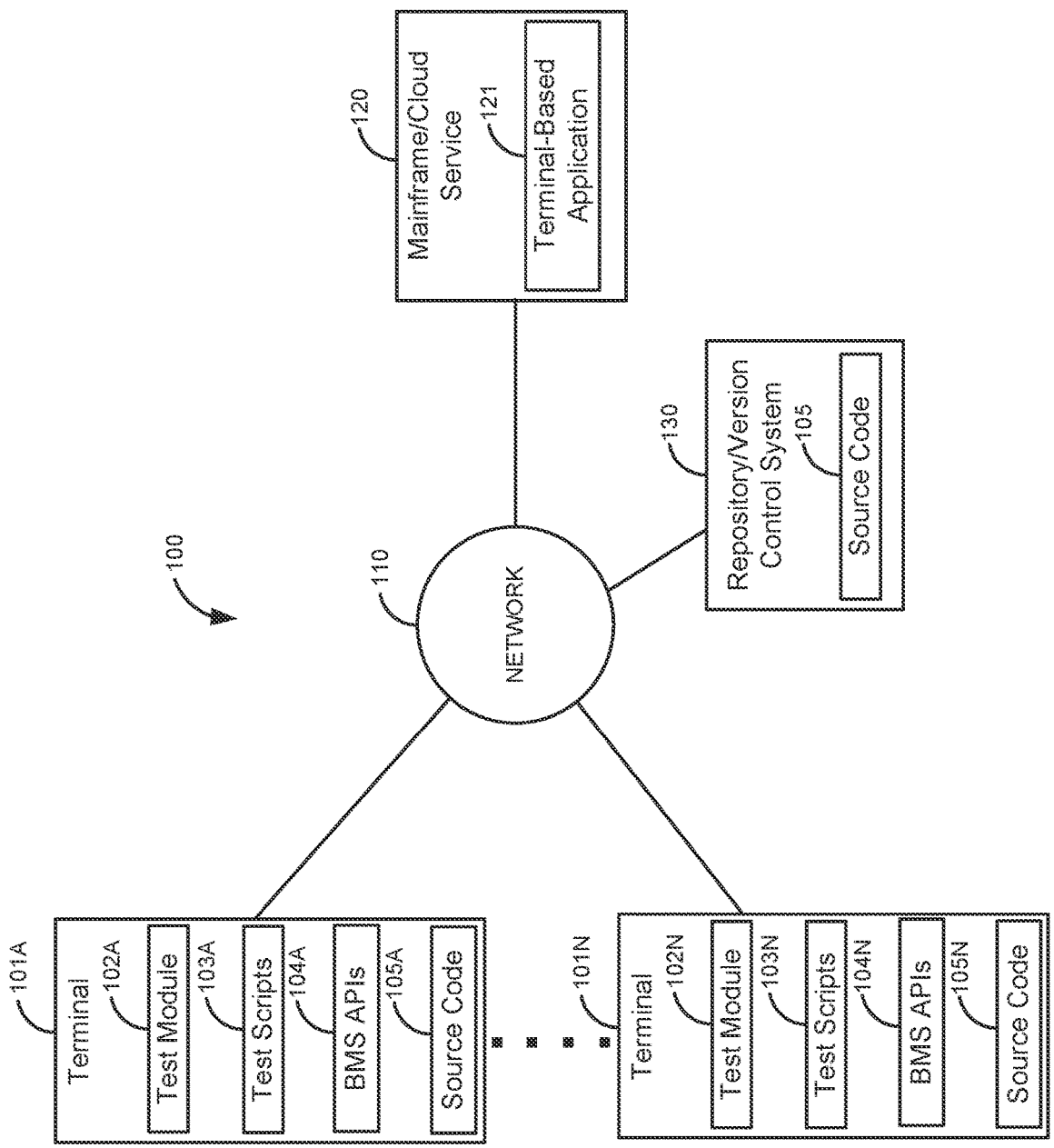
FIG. 1 is a block diagram of a first illustrative system for correlating screen data to generate test scripts.

FIG. 1 is a block diagram of a first illustrative system 100 for correlating screen data to generate test scripts 103. The first illustrative system 100 comprises terminals 101A-101N, a network 110, a mainframe/cloud service 120, and a repository/version control system 130.

The terminals 101A-101N can be or may include any device that can communicate with the terminal-based application 121, such as an IBM 3270 terminal (e.g., see Network Working Group RFC 1576 "TN3270 Current Practices," Networking Group RFC 2355 "TN3270 Enhancements," and the IBM 3270 Data Stream Programmer's Reference (GA23-0059-)), an IBM 5250 terminal, and the like. As shown in FIG. 1, any number of terminals 101A-101N may be connected to the network 110. The terminals 101A-101N further comprise test modules 102A-102N, test scripts 103A-103N, Basic Mapping Support (BMS), Application Programming Interfaces (APIs), and source code 105A-105N.

In one embodiment, the terminal 101 may run as a terminal emulator on a device, such as a personal computer. In this embodiment, the test module 102, the test scripts 103, the BMS APIs 104, and the source code 106 may reside external to the terminal 101 emulator. For example, the terminal emulator may be separate from the test module 102, the test scripts 103, the BMS APIs 104, and the source code 105.

The test modules 102A-102N can be or may include any software that can be used to manage testing of the terminal-based application 121. The test modules 102A-102N can be used to capture screens of the terminals 101A-101N, retrieve text screen descriptions that include one or more field descriptions by accessing the BMS APIs 104A-104N of the terminal-based application 121, correlate image data of a displayed screen to the screen descriptions/field description(s) by running the test scripts 103A-103N, and/or the like.

The BMS APIs 104A-104N are APIs that are used to get the screen descriptions/text field descriptions. The BMS APIs 104A-104N may be implemented using various programming languages, such as Java, JavaScript, C, C++, JSON (JavaScript Object Notation), and/or the like. The BMS APIs 104A-104N use the source code 105A-105N to get the screen descriptions/text field descriptions.

The test scripts 103A-103N are one or more tests that are used to test the terminal-based application 121. The test scripts 103A-103N can be used to exercise all or parts of functionality associated with the terminal-based application 121 to ensure the terminal-based application 121 is working properly. The test scripts 103A-103N may be used to test that the terminal-based application 121 is still working properly after being migrated from a mainframe application to a non-mainframe application (e.g., a public cloud-based application or a private cloud-based application). The test scripts 103A-103N are used to simulate a user using the terminal(s) 101. The test scripts 103A-103N may be generated in different programming languages based on implementation.

The source code 105A-105N is used by the BMS API 104 to generate the BMS mappings. For example, the object names of each screen/text field can be learned by scanning the source code 105. The BMS mappings have the screen descriptions (e.g., a screen name) and the associated mappings of text field descriptions (e.g., names of the text fields for a specific displayed screen that is generated by the terminal-based application 121). The source code 105A-105N is the source code 105 of the terminal-based application 121.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Transmission Communication Protocol (TCP), Telnet, Systems Network Architecture (SNA) protocol, and/or the like. Thus, the network 110 is an electronic communication network configured to carry messages via packets and/or circuit switched communications.

The mainframe/cloud service 120 can be any mainframe and/or cloud service that can host the terminal-based application 121. The mainframe/cloud service 120 may initially be a mainframe application and then switch to a cloud service or stand-alone application. The mainframe/cloud service 120 further comprises the terminal-based application 121.

The terminal-based application 121 can be any application that is designed to work with the terminals 101A-101N, such as, a financial application, a computer application, a database application, a transaction application, a human resources application, and/or the like. The terminal-based application 121 is typically an application that is designed to run on a mainframe that is created using the COBOL (Common Business Oriented Language) programming language. Although Cobol is an old programming language, there are still a large number of terminal-based applications 121 that are still in existence and are being migrated from a mainframe to a cloud-based service 120.

The repository/version control system 130 can be any server/device that can manage/control the source code 105 for the terminal-based application 121. The source code 105 in the repository/version control system 130 is the same as the source code 105A-105N. The source code 105 is the source code 105 of the terminal-based application 121. The terminals 101A-101N may download a copy of the source code 105 for use with the BMS APIs 104A-104N from the repository/version control system 130.

Figure 2:
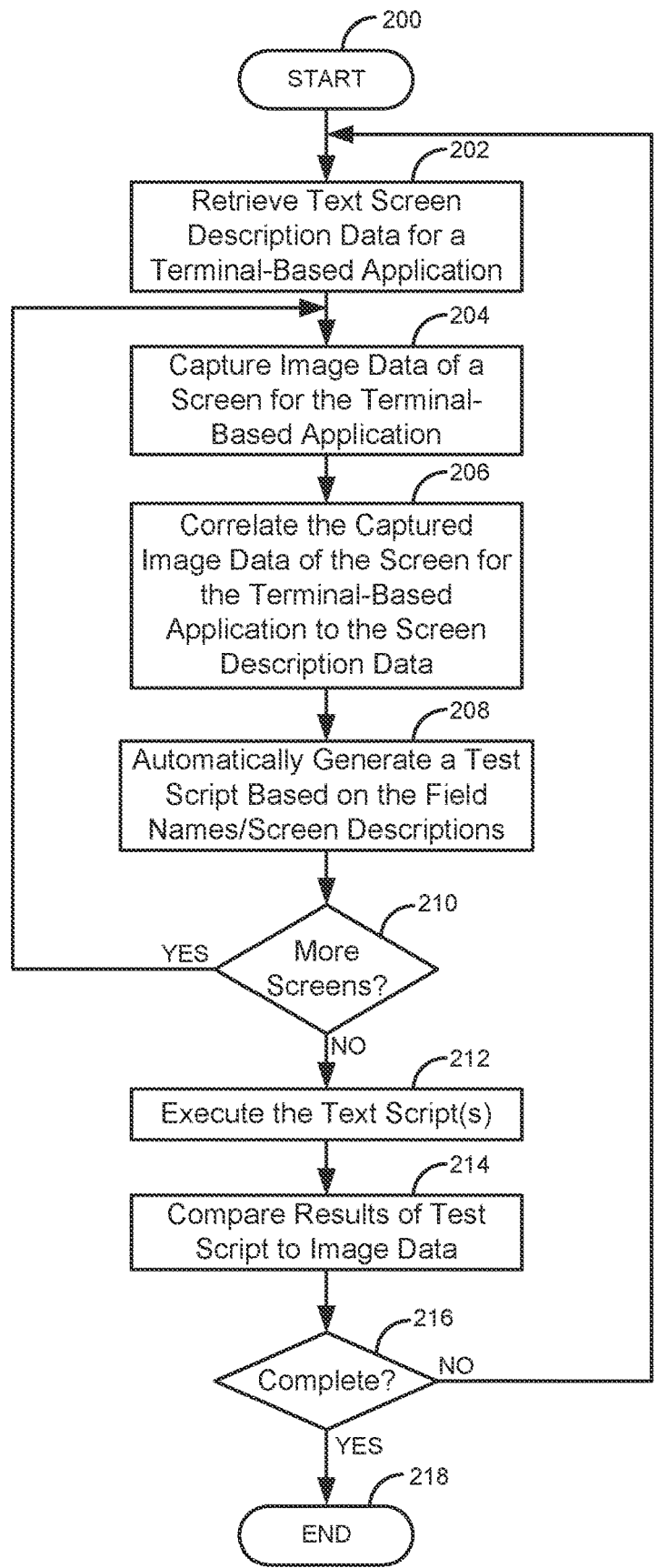
FIG. 2 is a flow diagram of a process for correlating screen data to generate test scripts.

FIG. 2 is a flow diagram of a process for correlating screen data to generate test scripts 103A-103N. Illustratively, the terminals 101A-101N, the test modules 102A-

102N, the test scripts 103A-103N, the BMS APIs 104A-104N, the source code 105A-105N, the mainframe/cloud service 120, the terminal based application 121, and the repository/version control system 130, are stored-program-controlled entities, such as a computer or microprocessor, which performs the method of FIG. 2 and the processes described herein by executing program instructions stored in a computer readable storage medium, such as a memory (i.e., a computer memory, a hard disk, and/or the like). Although the method described in FIG. 2 is shown in a specific order, one of skill in the art would recognize that the steps in FIG. 2 may be implemented in different orders and/or be implemented in a multi-threaded environment. Moreover, various steps may be omitted or added based on implementation.

The process starts in step 200. The test module 102 retrieves text screen description data for the terminal-based application 121 in step 202. For example, the test module 102 may use the BMS APIs 104 to get the screen descriptions and their associated text field descriptions. The terminal-based application 121 typically has a number of screens. Each screen will have a unique name (i.e., a fully qualified name) that is called a screen description as defined in the source code 105. Likewise, each screen will have one or more text fields that have a text field description (e.g., a fully qualified name). The fully qualified name allows for easy identification of the screen name/text fields so that if the code changes, they can still be easily identified. An individual text field may be shown on multiple screens.

Below is an example of screen description data/text field descriptions provided by the BMS APIs 104.
 MBANK10 DFHMSD BASE=MAPAREA,
  LANG=COBOL,
  MODE=INOUT,
  TIOAPFX=YES,
  TYPE=&&SYSPARM
 BANK 10A DFHMDI DSATTS=(COLOR,HILIGHT,PS,
  VALIDN),
  MAPATTS=(COLOR,HILIGHT,PS,VALIDN),
  SIZE=(24,80)
 TXT01 DFHMDF ATTRB=(ASKIP,NORM),
  COLOR=TURQUOISE,
  LENGTH=5,
  POS=(1,1),
  INITIAL='Scrn:'
 SCRN DFHMDF ATTRB=(ASKIP,FSET,NORM),
  COLOR=TURQUOISE,
  LENGTH=6,
  POS=(1,7),
  INITIAL='BANK10'
 HEAD1 DFHMDF ATTRB=(ASKIP,NORM),
  COLOR=YELLOW,
  LENGTH=50,
  POS=(1,16),
  INITIAL=' '

In this example, in the first line "MBANK10 DFHMSD BASE=MAPAREA," the identifier "DFHMSD" identifies the terminal-based application 121 (BANK10A). In this example, the terminal-based application 121 is written in Cobol (indicated by the line "LANG=COBOL"). In the line "BANK10A DFHMDI DSATTS=(COLOR,HILIGHT,PS, VALIDN)," the term "DFHMDI" identifies the screen description for the screen DSATTS. In the line "TXT01 DFHMDF ATTRB=(ASKIP,NORM)," the term DFHMDF identifies the text field description. Likewise, for the lines "SCRN DFHMDF ATTRB=(ASKIP,FSET,NORM)" and "HEAD1 DFHMDF ATTRB=(ASKIP,NORM)," the term DFHMDF also identifies the text field definitions for these particular text fields that are displayed in the screen DSATTS. In addition, the text fields also have other data to help identify the text fields, such as, the "COLOR" parameter, the "LENGTH" parameter, the POS (position) parameter, and the "INITIAL" (initial text) parameter.

The test module 102 may capture the text in different ways. For example, the text can be captured via a terminal emulator's host access Application Programming Interface (API) or by capturing image data of a screen(s) for the terminal-based application 121 in step 204. These unique identifiers (e.g., TXT01, SCRN, HEAD1, etc.) are used to correlate screens with captured images in step 206. For example, the test module 102 can use the COLOR, the LENGTH, the POS, and the INITIAL parameters to help identify a screen/text field(s) in a captured image to correlate the data from a screen capture.

A text script 103 is automatically generated, in step 208, using the data from the correlation in step 206. For example, if text was entered in a first text field and new text data was displayed in other text fields, this information can be tracked, correlated, and used to automatically generate the test script 103. This is useful in testing changes/migration of the terminal-based application 121. For example, the terminal-based application 121 should behave in the same manner when migrated from a mainframe to a cloud service 120.

The test module 102 determines, in step 210, if there are more screens to test. If there are more screens to be tested in step 210, the process is repeated for each of the screens of the terminal-based application 121 by returning to step 204. For example, if there are twenty screens that are displayed by the terminal-based application 121, one or more test scripts 103 may be generated for each of the twenty screens. This provides a comprehensive test of the terminal-based application 121.

If there are no more screens in step 210, the test scripts 103 may be executed (e.g., at a later date). The results of the test scripts 103 are compared to the image data captured when executing the test scripts 103 to see if they are the same. In some instances, the data may always change. For example, some fields, like displayed time/date fields may change for each test, these types of fields may be excluded from the test results based on a user defining specific types of fields to ignore.

The test manager 102 determines, in step 216, if the process is compete. If the process is complete in step 216, the process ends in step 218. Otherwise, the process goes back to step 202.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, Java® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
retrieve text screen description data for a terminal-based application, wherein the text screen description data comprises a screen description and one or more text field descriptions associated with the screen description, wherein the one or more text field descriptions are associated with one or more text fields, and wherein the text screen description data is based on Basic Mapping Support (BMS) mappings;
capture image data of a first screen for the terminal-based application;
identify, using an identifier associated with the first screen, text screen description data for the first screen in source code of the terminal-based application:
correlate the captured image data of the first screen of the terminal-based application to the text screen description data for the first screen in the terminal-based application to identify the one or more text fields; and
automatically generate a test script to execute a function of the terminal-based application to test the one or more text fields based on the correlation.

2. The system of claim 1, wherein the microprocessor readable and executable instructions further cause the microprocessor to:
execute the test script to test the terminal-based application; and
compare results of the captured image data with results of the test script to verify the function of the terminal-based application.

3. The system of claim 2, wherein the automatically generated test script uses fully qualified field names and screen names that identify the one or more text fields.

4. The system of claim 2, wherein automatically creating the test scripts comprises automatically creating the test scripts in a user defined language.

5. The system of claim 2, wherein the terminal-based application has been migrated to a new platform and the test script is executed on the migrated terminal-based application.

6. The system of claim 1, wherein the BMS mappings are generated based on source code of the terminal-based application, and wherein object names of each field are learned by scanning the source code.

7. The system of claim 1, wherein the screen descriptions are based on source code of the terminal-based application.

8. The system of claim 1, wherein the test script is used to test the terminal-based application and wherein the terminal-based application has been migrated from a mainframe application to a non-mainframe application.

9. A method comprising:
retrieving, by a microprocessor, text screen description data for a terminal-based application, wherein the text screen description data comprises a screen description and one or more text field descriptions associated with the screen description, wherein the one or more text field descriptions are associated with one or more text fields, and wherein the text screen description data is based on Basic Mapping Support (BMS) mappings;
capturing, by the microprocessor, image data of a first screen for the first screen in the terminal-based application;
identifying, using an identifier associated with the first screen, text screen description data for the first screen in source code of the terminal-based application;
correlating, by the microprocessor, the captured image data of the first screen of the terminal-based application to the identified text screen description data for the terminal-based application to identify the one or text fields; and
automatically generating, by the microprocessor, a test script to execute a function of the terminal-based application to test the identified one or more text fields based on the correlation.

10. The method of claim 9, further comprising:
executing the test script to test the terminal-based application; and
comparing results of the captured image data with results of the test script to verify the function of the terminal-based application.

11. The method of claim 10, wherein the automatically generated test script uses fully qualified field names and screen names that identify the one or more text fields.

12. The method of claim 10, wherein automatically creating the test scripts comprises automatically creating the test scripts in a user defined language.

13. The method of claim 10, wherein the terminal-based application has been migrated to a new platform and the test script is executed on the migrated terminal-based application.

14. The method of claim 9, wherein the BMS mappings are based on source code of the terminal-based application, and wherein object names of each field are learned by scanning the source code.

15. The method of claim 9, wherein the screen descriptions are based on source code of the terminal-based application.

16. The method of claim 9, wherein the test script is used to test the terminal-based application and wherein the terminal-based application has been migrated from a mainframe application to a non-mainframe application.

17. A non-transient computer readable medium having stored thereon instructions that cause a microprocessor to execute a method, the method comprising instructions to:
retrieve text screen description data for a terminal-based application, wherein the text screen description data comprises a screen description and one or more text field descriptions associated with the screen description, wherein the one or more text field descriptions are associated with one or more text fields, and wherein the text screen description data is based on Basic Mapping Support (BMS) mappings;
capture image data of a first screen for the terminal-based application;
identify, using an identifier associated with the first screen, text screen description data for the first screen in source code of the terminal-based application;
correlate the captured image data of the first screen of the terminal-based application to the identified text screen description data for the first screen in the terminal-based application to identify the one or text fields; and
automatically generate a test script to execute a function of the terminal-based application to test the identified one or more text fields based on the correlation.

18. The non-transient computer readable medium of claim 17, wherein the instructions further cause the microprocessor to:
execute the test script to test the terminal-based application; and
compare results of the captured image data with results of the test script to verify the function of the terminal-based application.

19. The non-transient computer readable medium of claim 18, wherein the automatically generated test script uses fully qualified field names and screen names that identify the one or more text fields.

20. The non-transient computer readable medium of claim 18, wherein automatically creating the test scripts comprises automatically creating the test scripts in a user defined language.

* * * * *